United States Patent
Lee et al.

(10) Patent No.: US 9,847,710 B2
(45) Date of Patent: Dec. 19, 2017

(54) UNIVERSAL SYSTEM STRUCTURE FOR LOW POWER ADAPTERS

(71) Applicant: Virginia Tech Intellectual Properties, Inc., Blacksburg, VA (US)

(72) Inventors: Fred C. Lee, Blacksburg, VA (US); Xiucheng Huang, Blacksburg, VA (US); Qiang Li, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 15/085,225

(22) Filed: Mar. 30, 2016

(65) Prior Publication Data

US 2016/0294296 A1 Oct. 6, 2016

Related U.S. Application Data (60) Provisional application No. 62/142,109, filed on Apr. 2, 2015.

(51) Int. Cl.

| H02M 3/335 | (2006.01) |
|---|---|
| H02M 1/42 | (2007.01) |
| H02M 1/44 | (2007.01) |
| H02M 1/00 | (2006.01) |

(52) U.S. Cl.
CPC .......... *H02M 1/4258* (2013.01); *H02M 1/44* (2013.01); *H02M 3/33592* (2013.01); *H02M 2001/0058* (2013.01); *Y02B 70/126* (2013.01); *Y02B 70/1433* (2013.01); *Y02B 70/1475* (2013.01); *Y02B 70/1491* (2013.01)

(58) Field of Classification Search
CPC .... H02M 1/42; H02M 1/4241; H02M 1/4258; H02M 1/44; H02M 3/335; H02M 3/33546; H02M 3/33592; H02M 2001/0058; Y02B 70/126; Y02B 70/1433; Y02B 701/1475; Y20B 1/1491
See application file for complete search history.

(56) References Cited

U.S. PATENT DOCUMENTS

| 8,218,339 B2* | 7/2012 | Li | H02M 3/33592 363/21.06 |
|---|---|---|---|
| 8,542,501 B2* | 9/2013 | Kyono | H02M 3/285 363/21.02 |
| 2009/0034299 A1* | 2/2009 | Lev | H02M 3/33592 363/17 |

(Continued)

*Primary Examiner* — Matthew Nguyen
(74) *Attorney, Agent, or Firm* — Whitham, Curtis & Cook, P.C.

(57) ABSTRACT

A two-stage power converter architecture including an isolation transformer and rectification of the isolation transformer output by an LLC resonant circuit and methodology for operating the same feeds an output voltage back to a circuit for generating waveforms for controlling a totem pole circuit to provide output voltage regulation as well as rectification of AC input voltage. The circuit for controlling the totem pole circuit may also be responsive to the AC input power waveform to provide power factor correction (PFC), in which case, the feedback signal provides additional pulse width modulation of the PFC signals. Bus capacitor size may also be reduced by injecting harmonics of the AC input waveform into the feedback signal which also serves to substantially maintain efficiency of the (preferably LLC) resonant second stage.

10 Claims, 11 Drawing Sheets

(56) References Cited

U.S. PATENT DOCUMENTS

| | | | |
|---|---|---|---|
| 2012/0320633 A1* | 12/2012 | Chen | H02M 3/33592 363/21.01 |
| 2014/0091720 A1* | 4/2014 | Brinlee | H05B 33/0815 315/186 |
| 2014/0225439 A1* | 8/2014 | Mao | H02M 3/3376 307/31 |
| 2015/0372585 A1* | 12/2015 | Kutschak | H02M 1/36 363/21.12 |
| 2016/0241132 A1* | 8/2016 | Lin | H02M 1/4225 |

* cited by examiner

Figure 14

UNIVERSAL SYSTEM STRUCTURE FOR LOW POWER ADAPTERS

CROSS-REFERENCE TO RELATED APPLICATIONS

This application claims benefit of priority of U.S. Provisional Application 62/142,109, filed Apr. 2, 2015, which is hereby incorporated by reference in its entirety.

FIELD OF THE INVENTION

The present invention generally relates to low power adapters for providing power to offline electrical devices and, more particularly to and architecture therefor providing improved efficiency and power density.

BACKGROUND OF THE INVENTION

Much of the electrical power in use worldwide is distributed at high alternating current (AC) from the location at which it is generated to a location proximate to where is will be utilized. High voltage allows power transmission over long distance with reduced wiring cost and resistive losses. Voltage can then be reduced, usually in stages, to lower voltage suitable for intended loads. This power distribution system is often referred to as the "power grid" or, simply, "grid".

However, most electrical and electronic devices operate as a substantially fixed voltage, referred to as direct current (DC) and are often arranged to be temporarily connected to the grid or disconnected therefrom during which time they are operated from batteries that may be recharged from the power distributed on the grid. Accordingly, such devices, referred to as "offline", require power conversion from AC to DC power and often the DC power is regulated at a much lower voltage than the voltage available from a connection to the grid. (More specifically, "offline power supply" is defined as a power supply in which the line voltage is rectified and filtered without using a line frequency isolation transformer, which does not preclude inclusion of a high frequency isolation transformer.) Devices that perform such conversion and possibly voltage regulation are often referred to as "adapters" and may be integrated with the electrical device for which they supply power or constructed as a separate structure with wires and fixtures for connection to both the grid and the electrical device.

At the present time, large numbers of low power adapters are commercially required since a large proportion of currently available consumer electronics product are marketed with an adapter. The predominant power ratings for commercially available adapters has been 90 Watts and 65 Watts but the demand for those ratings has been slightly declining in recent years in favor of adapters rated at 45 Watts, due to reduced power requirements of currently available microprocessors. Nevertheless, demand for 65 and 90 Watt adapters remains very strong.

So-called flyback converters (essentially a buck-boost topology DC-DC converter including a transformer for isolation and so-called because the energy transferred to the secondary side of the transformer is reflected back to the primary side when the primary side is "off" or non-conducting) are widely used in low power adapter applications, particularly for power requirements of 75 Watts or less since there is no power factor correction requirement and the topology is very simple and of low cost. Above 75 Watts, a two stage power converter is used to meet power factor requirements.

The best 90 Watt rating adapter currently on the market in terms of efficiency and power density is comprised of an h-bridge PFC stage and an LLC resonant converter stage. The adapter has a power density of about 11 W/in$^3$ and a peak efficiency of about 93% with a worst case efficiency of about 91.8% at 90 V input. The best commercially available 65 Watt adapter uses a flyback topology power converter and achieves a power density of about 92.2% with a worst case efficiency of about 90.6% at 90 volts input. Both of these adapters operate at a frequency in the range of 100-200 kHz and most of the volume is occupied by passive components. The EMI filter must be large to attenuate the relatively low switching frequency noise and both require hand made magnetic components which are not cost-effective to construct and are very subject to parameter variation. Therefore, while these adapters are considered to be the best adapters commercially available from the standpoint of power density and efficiency, higher efficiency and further reduced volume are desirable, particularly as required power ratings for adapters are being reduced.

SUMMARY OF THE INVENTION

It is therefore an object of the present invention to provide an adapter architecture that allows further volume reduction and increase in power density and efficiency beyond that of adapters available at the present state of the art.

It is another object of the present invention to provide an adapter that is highly efficient while avoiding a requirement for labor intensive passive component assembly and consequent parameter variation while reducing size, particularly in regard to magnetic components.

It is a further object of the invention to provide an adapter circuit allowing injection of harmonics of input power to reduce bus capacitance requirements and bus capacitor size.

In order to accomplish these and other objects of the invention, a power converter architecture is provided including a first stage comprising a totem pole circuit and a controller for switches in the totem pole circuit, a second stage comprising a resonant direct current transformer (DCX) circuit and connected to the first stage by a voltage bus, and a feedback circuit connecting an output of the DCX to the controller of the totem pole circuit whereby the totem pole circuit provides output voltage regulation as well as rectification of AC input power. Thus, the totem pole first stage can perform both rectification and output voltage regulation as well as power factor correction while the second stage resonant circuit provide reduced losses and increased efficiency. Bus capacitor size may be reduced while largely maintaining efficiency by injecting harmonics of the AC input voltage waveform into the feedback loop.

In accordance with another aspect of the invention, a method of operating a power converter is provided comprising steps of rectifying input AC voltage with a totem pole switching circuit to provide DC power, periodically connecting and disconnecting a primary winding of an isolation transformer to the DC power, rectifying a voltage on a secondary winding of the isolation transformer to provide an output voltage, and controlling a circuit for driving switches of the totem pole switching circuit in accordance with the output voltage to provide regulation of the output voltage.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
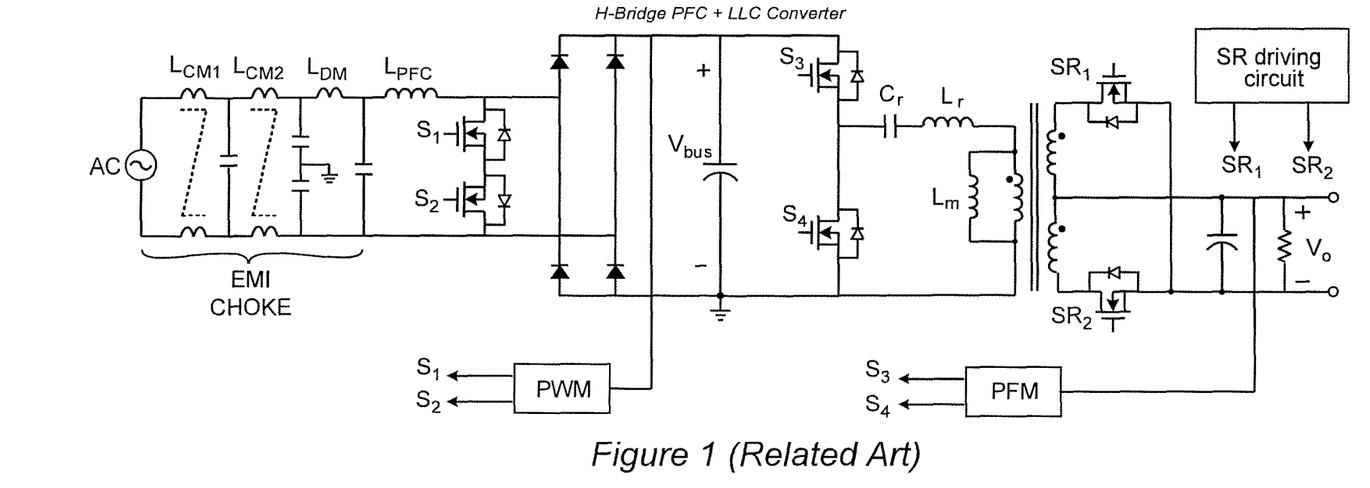
FIG. 1 is a schematic diagram of a state-of the art 90 W adapter.
Figure 2:
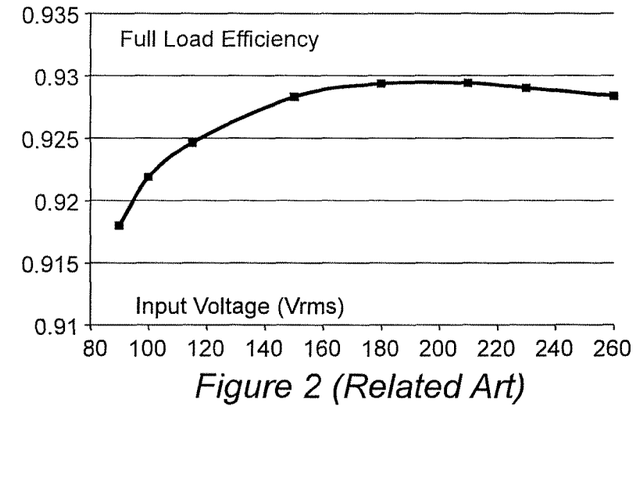
FIG. 2 is a graph of efficiency as a function of input voltage for the adapter of FIG. 1.

Referring now to the drawings, and more particularly to FIG. 1, there is shown a generalized schematic diagram of a state of the art 90 W adapter as alluded to above. It should be appreciated that this schematic diagram of FIG. 1 and FIGS. 2-7 and 10 are arranged to facilitate an understanding and appreciation of the meritorious effects of the invention by comparison therewith and no portion of any of these Figures is admitted to the prior art in regard to the present invention. Therefore, these Figures have been related art since the invention or performance or operation thereof is not depicted.

It can be readily observed from FIG. 1 that the power converter is comprised of two stages: an H-bridge power factor correction (PFC) circuit (with an EMI choke depicted at the left side thereof where AC power is input) on the left side of FIG. 1 and an LLC resonant converter on the right side thereof. The EMI filter is also composed of two sections: one with cross-coupled inductors, $L_{CM1}$ and $L_{CM2}$ and capacitors for blocking common mode noise and an LC circuit including inductor $L_{DM}$ for blocking differential mode noise. The power factor correction circuit includes an inductor, $L_{PFC}$, two series connected switches, a full bridge diode rectifier circuit and a pulse width modulator. The function of this circuit is to adjust the pulse and polarity of current pulses in the rectifier circuit and the bus capacitor to be proportional to the instantaneous amplitude of the AC input voltage. The LLC resonant converter on the right side of FIG. 1 comprises two switches that are operated in a complementary fashion to supply periodically increasing and decreasing current to the primary winding an isolation transformer, two synchronous rectifier switches connected to the secondary winding of the isolation transformer, an output capacitor, an SR driving signal generator, and a pulse frequency modulation circuit responsive to output voltage of the converter (also of a non-critical design or type. This adapter is quite efficient as alluded to above and graphically depicted in FIG. 2.

Figure 5:
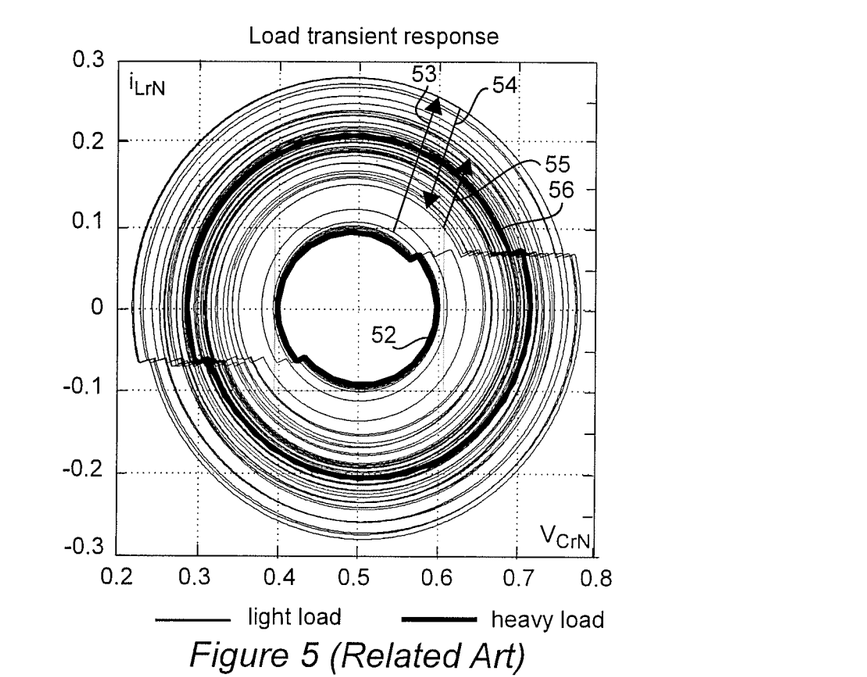
FIG. 5 is a trajectory diagram of the response of an LLC resonant converter of FIG. 3 to a step-up transient.

The principal drawback of this adapter is its poor dynamic performance which is depicted as a voltage-current trajectory plot in FIG. 5. Specifically, in the plot of normalized instantaneous voltage against normalized instantaneous current, a low load is represented by trajectory 52. When a step-up transient occurs, the trajectory expands to a very large trajectory as depicted by arrow 53, contracts as shown by arrow 54 and again expands as shown by arrow 55 and so on in an oscillatory manner, greatly extending the time before steady-state operation is again achieved as represented by trajectory 56 largely due to the resonant nature of the LLC converter and causing stress issues at start up and under short circuit conditions. By the same token, variation of switching frequency for voltage regulation inherently incurs a degree of compromise of efficiency. Moreover, the SR driving is quite difficult to achieve in an optimal manner at high frequency due to the impact of parasitic inductances and capacitances of the passive elements of the converter.

Figure 3:
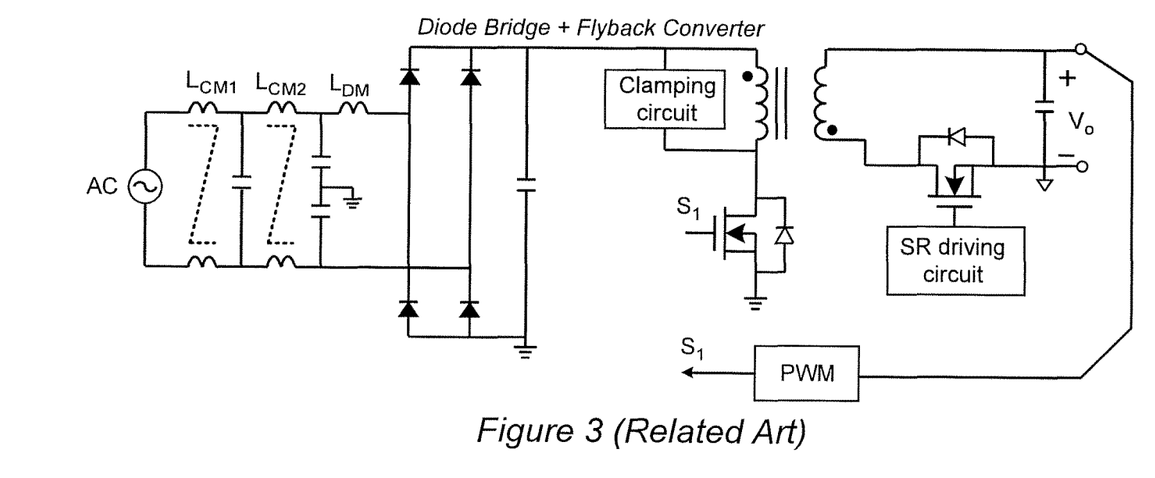
FIG. 3 is a schematic diagram of a state-of the art 65 W adapter.
Figure 4:
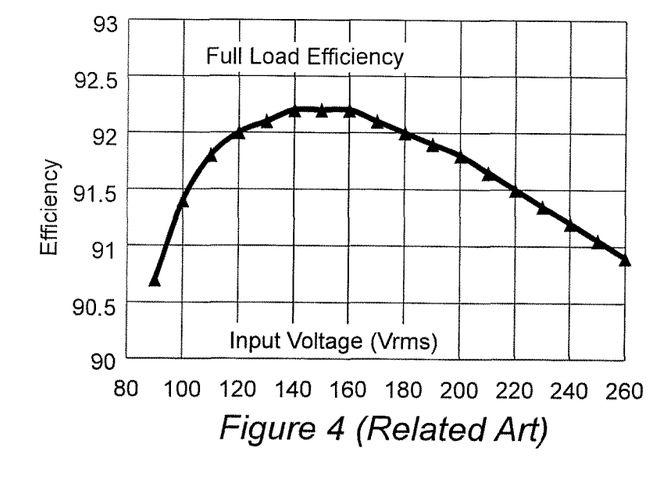
FIG. 4 is a graph of efficiency as a function of input voltage for the adapter of FIG. 31.

A generalized schematic diagram of a state of the art 65 W adapter is shown in FIG. 3. Similar to the 90 W converter discussed above the converter has two basic stages. The first stage comprises an EMI filter and full bridge rectifier but no PFC is required. The second stage is simply a flyback converter with a passive clamping circuit in parallel with the primary winding of the isolation transformer. A synchronous rectifier is usually employed to improve system efficiency. The efficiency is slightly lower than that of the 90 W adapter described above which is graphically depicted in FIG. 4. Additionally, deriving signals to properly drive the SRs is even more difficult than in the adapter of FIG. 1 due to oscillatory behavior caused by the parasitic inductances and capacitances of the SRs and passive elements.

Figure 6:
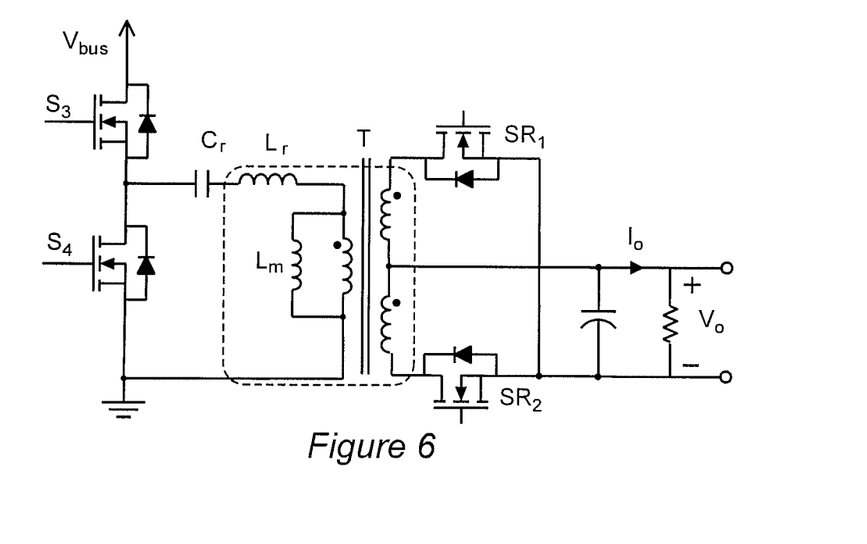
FIG. 6 is a generalized schematic diagram of an LLC resonant power converter in combination with a so-called DC transformer (DCX) power converter.
Figure 7:
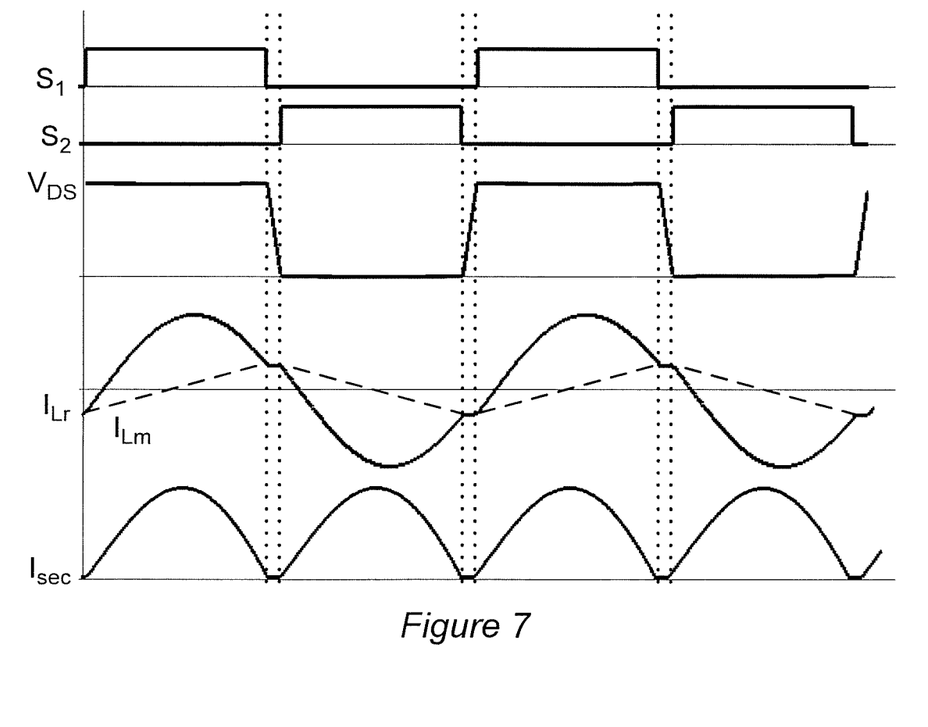
FIG. 7 is an illustration of operational waveforms of the power converter of FIG. 6.

However, the inventors have discovered that none of the drawbacks of the LLC power converter of FIG. 1 is observed when the LLC power converter is operated at a fixed frequency, preferably close to the resonant frequency and only positive effects of an LLC resonant converter are observed. Zero voltage switching (ZVS) can be achieved over a wide range of load conditions, Zero current switching of the SRs is achieved and the driving signal is greatly simplified since the primary switching control driving signals (in which S3 corresponds to SR2 and S4 is corresponding to SR1) can be used for driving the SRs as shown in FIGS. 6 and 7. Additionally conduction loss is minimal and no external resonant inductance is needed presenting the possibility of magnetic integration. However, operation at a fixed frequency is not possible in the adapter architecture of FIG. 1 since a variable frequency is required for the LLC converter to provide voltage regulation.

Figure 8:
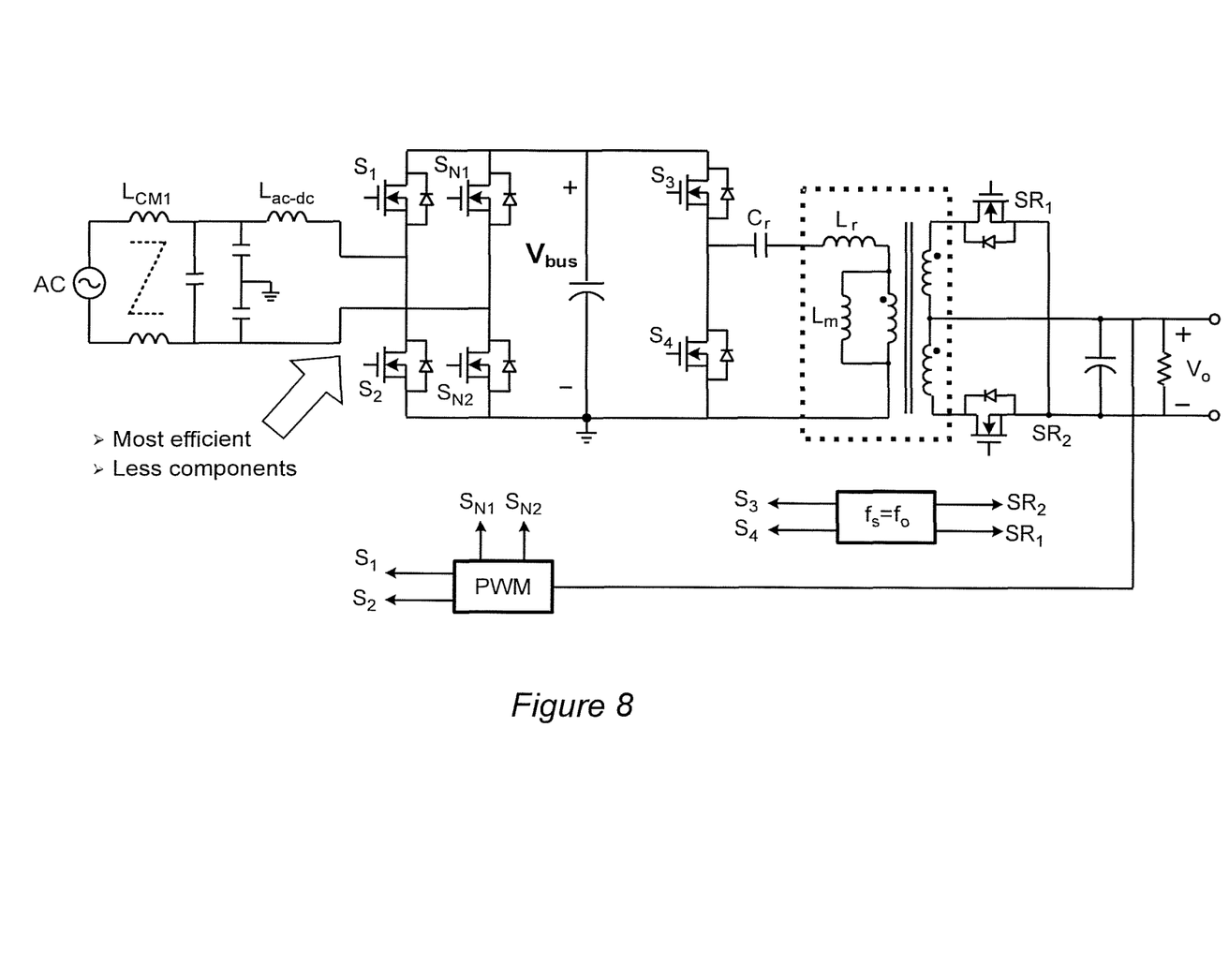
FIG. 8 is a schematic diagram of a 75 W (at which current harmonic requirements begin) or greater power converter circuit in accordance with the invention including power factor correction (PFC) and LLC-DCX and electromagnetic interference (EMI) noise filtering in accordance with the invention.

Referring now to FIG. 8 an adapter architecture for adapter power greater than 75 W in accordance with the invention is schematically illustrated. the EMI filter and PFC circuit is substantially the same as that shown in FIG. 1 except that the switches are driven in a different manner, referred to as a totem pole configuration as will be discussed in greater detail below. This switch configuration has been shown to be the most efficient topology and requires the smallest number of components.

Operation of totem pole circuits, particularly for power factor correction is well understood in the art. Essentially, one pair of series connected switches is operated in a complementary fashion at the line frequency (e.g. one switching cycle is equal to a single cycle of the line frequency) while the other pair of series connected switches is operated at an arbitrarily high frequency and pulse width modulated in inverse proportion to the amplitude of the input frequency AC waveform so that power is transferred in phase with the AC input waveform while the low frequency switches essentially perform rectification. The inventors have recognized that the pulse width modulation of the high frequency switches can be further modulated to achieve rectification allowing the diode bridge to be eliminated. Since any physical electrical element contributes some degree of inefficiency, the omission of the diode bridge and the achievement of rectification by the totem pole circuit in accordance with the invention provides a substantial contribution to the increase in efficiency achieved by the invention. Similarly, use of the same totem pole circuit for regulation allows omission of variable frequency control of the SRs in the second stage and, further, allows choice of a fixed frequency for operation that can be optimized for additional efficiency. Additionally, only a single, simple feedback loop from the output to the control signal generator for the totem pole circuit is required, further reducing parts count, volume and internal power consumption.

Figure 9:
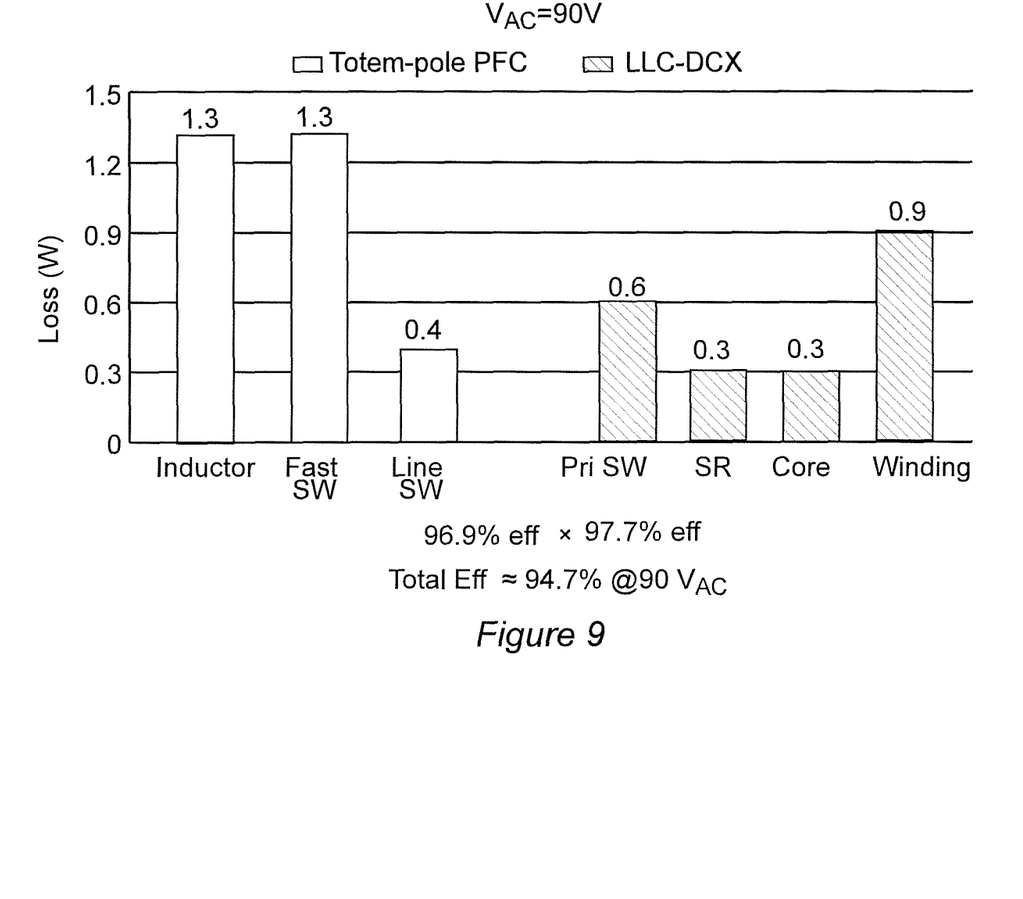
FIG. 9 is a graphical illustration of the loss breakdown of the circuit of FIG. 8.

That is, compared with the adapter architecture of FIG. 1, the full bridge diode rectifier can thus be omitted and rectification performed by the sequence of operation of the switches in the totem pole circuit. Similarly, the LLC power converter circuit is also the same as in the adapter architecture of FIG. 1 but is driven at a constant frequency and does not provide a regulation function. Such a circuit driven at a constant frequency still performs an isolation function and is referred to as an LLC DC transformer (LLC-DCX). with the first stage totem pole configuration and a second stage comprising a highly efficient LLC-DCX feedback can be taken from the LLC-DCX output and the regulation function is carried out by the PFC stage in addition to its function of regulating input current. Using the LLC-DCX for the second stage, losses in the second stage are minimized. Due to the bridgeless rectifier (e.g. absence of a diode bridge rectifier and preforming rectification in the totem pole circuit) the first stage losses are also very small. FIG. 9 graphically illustrates the loss breakdown in respective functional sections for a 90 W adapter operating at 1 MHz, The bridgeless PFC circuit provides 96.9% efficiency and the LLC-DCX circuit provides 97.7% efficiency for a total worst case (90V input) overall efficiency of about 94.7%. Given that many approaches to improving efficiency have been utilized over an extended period of time, this increased level of efficiency over prior architectures such as that of FIG. 1 is quite significant. The power density can also be increased to 26.7 W/in$^3$ which is an increase of more than a factor of two greater than the best adapters commercially available at the present time. The two stage totem pole PFC and LLC-DCX design can be easily extended to adapters capable of less than 75 W output power since there is no requirement for power factor correction (PFC), allowing a slight modification of control.

Figure 10:
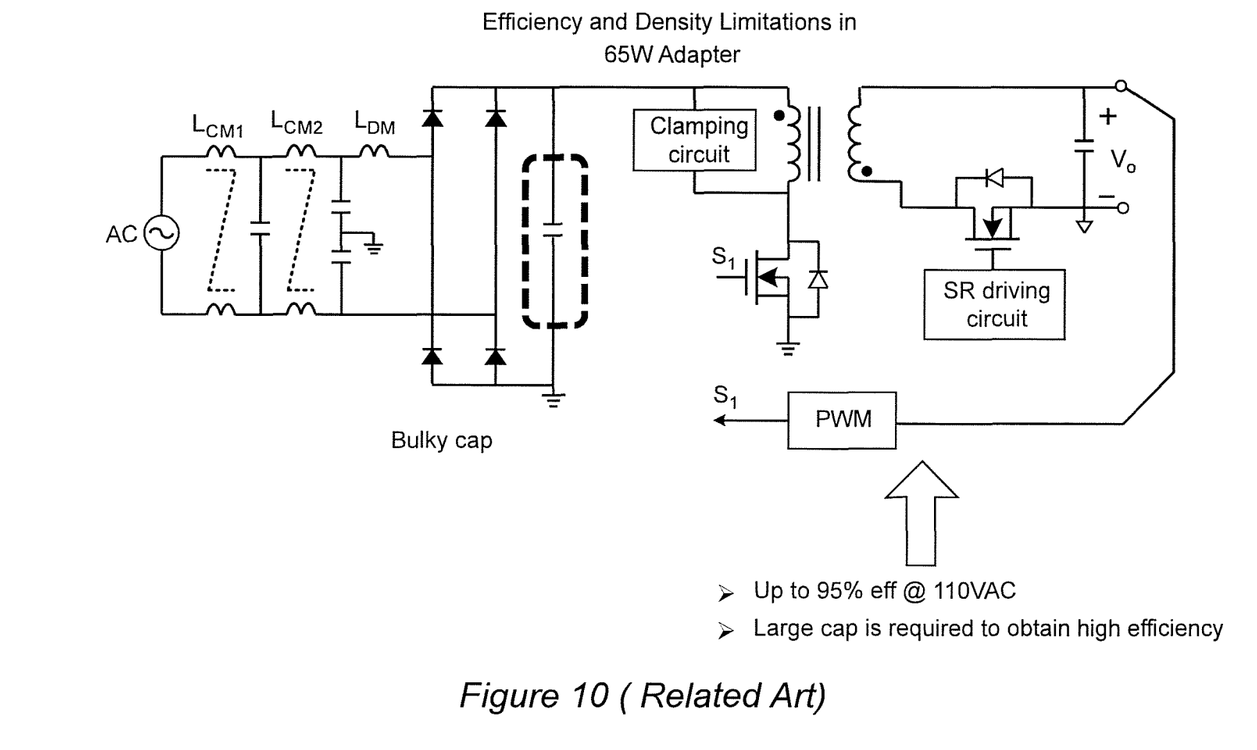
FIG. 10 is a schematic diagram of a power converter arranged to illustrate efficiency and power density limitations in known 65 w adapters.

Particularly in the embodiment for the adapter to deliver less than 75 W, a disproportionately very large bus capacitance is required to maintain high DC bus voltage in order to achieve high efficiency of the LLC-DCX second stage as illustrated in FIG. 10. Therefore, power density is effectively limited by the physical size of the bus capacitor and there is a trade-off between power density and efficiency for low power embodiments.

Figure 11:
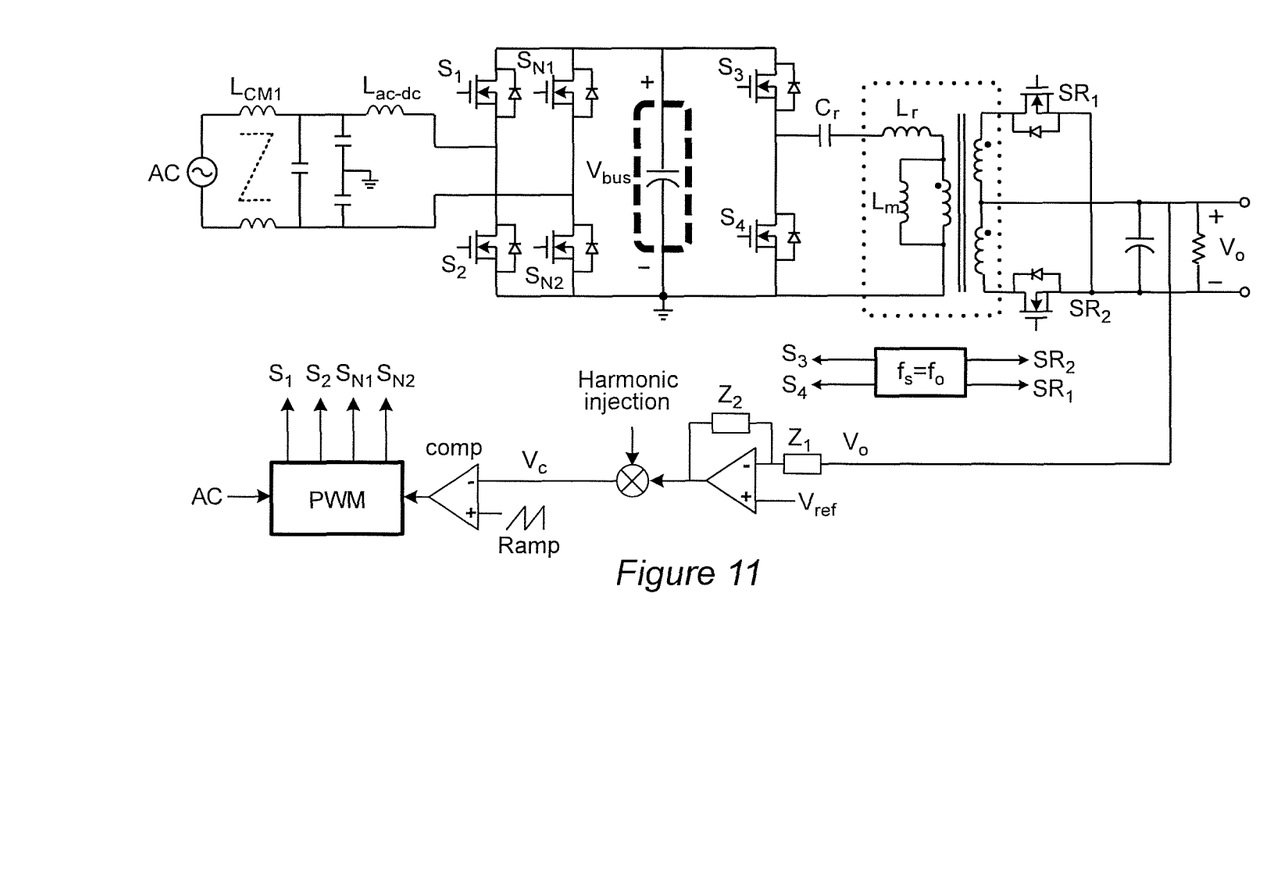
FIG. 11 is a schematic diagram of a 65 W power converter in accordance with the invention.
Figure 12:
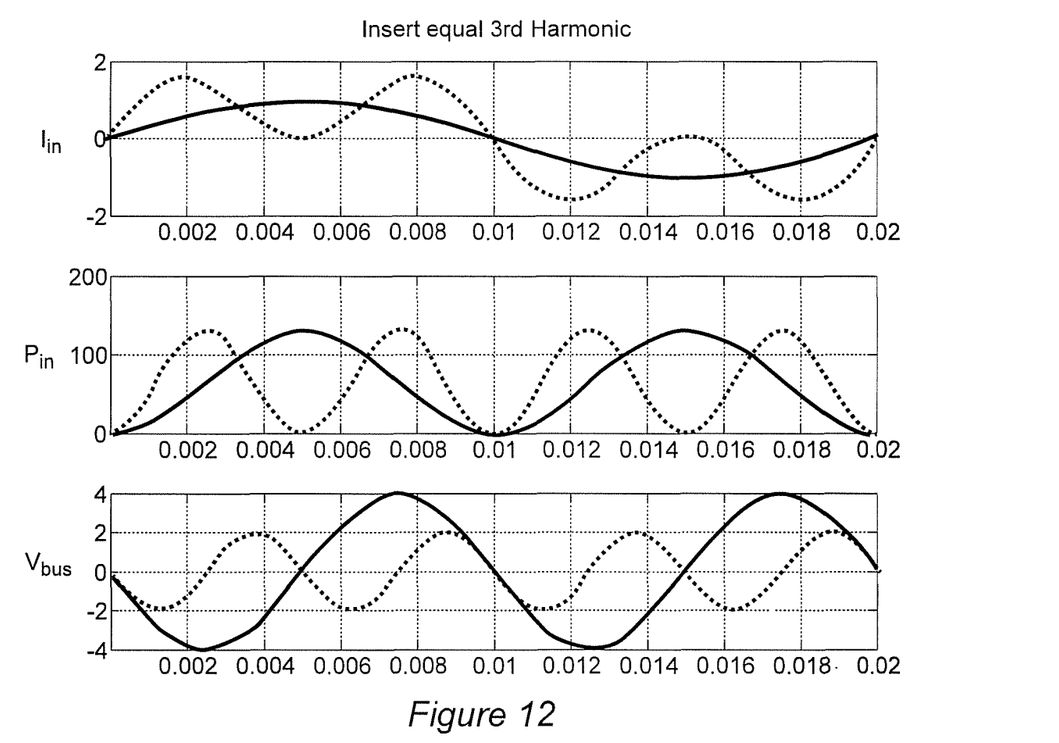
FIG. 12 illustrates operational waveforms of the power converter of FIG. 12 with and without third harmonic injection, FIG. 13 graphically illustrates the trade-off between power density and efficiency with and without harmonic injection.

Referring now to FIGS. 11 and 12, a perfecting feature of the invention allowing increased power density to be achieved will now be discussed. One of the key benefits of the proposed structure is that the feedback to the first stage allows certain harmonic current injection in adapters both below and above 75 W, and therefore allows reduction of the bus capacitance, which imposes a limitation on power density, significantly. The strategy of harmonic current injection is somewhat different between below and above 75 W adapter which is principally restricted by the harmonic standard IEC61000 3-2. That is, for adapters providing power below 75 W which does not require high power factor and low total harmonic distortion (THD), larger magnitude and higher orders of harmonic currents can be injected to help reduce the bus capacitance required to maintain efficiency of the second LLC-DCX stage. The basic principle and relationship between harmonic injection and bus capacitance reduction are as shown below. For adapters targeted at providing 75 W or more of power, less injection of harmonics is permitted or possible without complicating the input filtering but less harmonic injection is needed to maintain efficiency and the capacitance is not as disproportionately large relative to other components.

Referring now to FIG. 11, a preferred form of the invention including harmonic injection is schematically shown. FIG. 11 is similar to that of FIG. 10 except that the feedback path for the output voltage to the pulse width modulator, PWM, is shown in detail. Specifically, the output voltage is input to a first comparator where it is compared with a reference voltage, $V_{ref}$, using differential amplifier inputs. Preferably input and feedback impedances $Z_1$ and $Z_2$ are provided to adjust gain characteristics. The output is then provided to an adder which allows injection of harmonics of the input AC voltage to provide a control voltage, $V_c$, which is input to a further comparator for comparison with a ramp voltage to produce a pulse width modulated signal that is applied to the totem pole control signal generator PWM. Thus, the feedback path from the converter output provides for additional pulse width modulation of the totem pole control signals.

To consider the harmonic currents, the input line current can be expressed as $$i_{ac}(t) = \sum_{n=1}^{k} I_{mn} \sin(n \cdot \omega t) \qquad (1)$$

where $I_{mn}$ is the amplitude of the n-order harmonic current, $\omega$ is the angular frequency of the AC input, n is the harmonic order, and k is a constant to express the highest harmonic order.

The instantaneous input power is the product of input $v_{ac}(t)$ and $i_{ac}(t)$, which is $$p_{acn}(t) = V_m \sin(\omega t) \sum_{n=1}^{k} I_{mn} \sin(n \cdot \omega t) \qquad (2)$$

where $V_m$ is the amplitude of the line voltage source.

According to equation (2), the instantaneous input power with different combinations of injected harmonic currents can be calculated. The instantaneous input power without harmonic injection can be expressed as $$p_{ac\_1}(t) = V_m \left[ I_{m1} \frac{1 - \cos(2\omega t)}{2} \right] \quad (3)$$

Similarly, the instantaneous input power with injection of only third-order harmonic current can be described as $$p_{ac\_1+3}(t) = V_m \left[ I_{m1} \frac{1 - \cos(2\omega t)}{2} + I_{m3} \frac{\cos(2\omega t) - \cos(4\omega t)}{2} \right] \quad (4)$$

If $I_{m1}$ is equal to $I_{m3}$, then equation (4) can be rewritten as $$p_{ac\_1+3}(t) = V_m I_{m1} \left[ \frac{1 - \cos(4\omega t)}{2} \right] \quad (5)$$

It is clear that the frequency of the input power increases from double line frequency to four times the line frequency as shown in FIG. 12.

If more higher order harmonics are injected with same magnitude as Im1, then the instantaneous input power can be calculated as $$p_{ac\_1+\ldots+n}(t) = V_m I_{m1} \left\{ \frac{1 - \cos[(n+1)\omega t]}{2} \right\} \quad (6)$$

Figure 13:
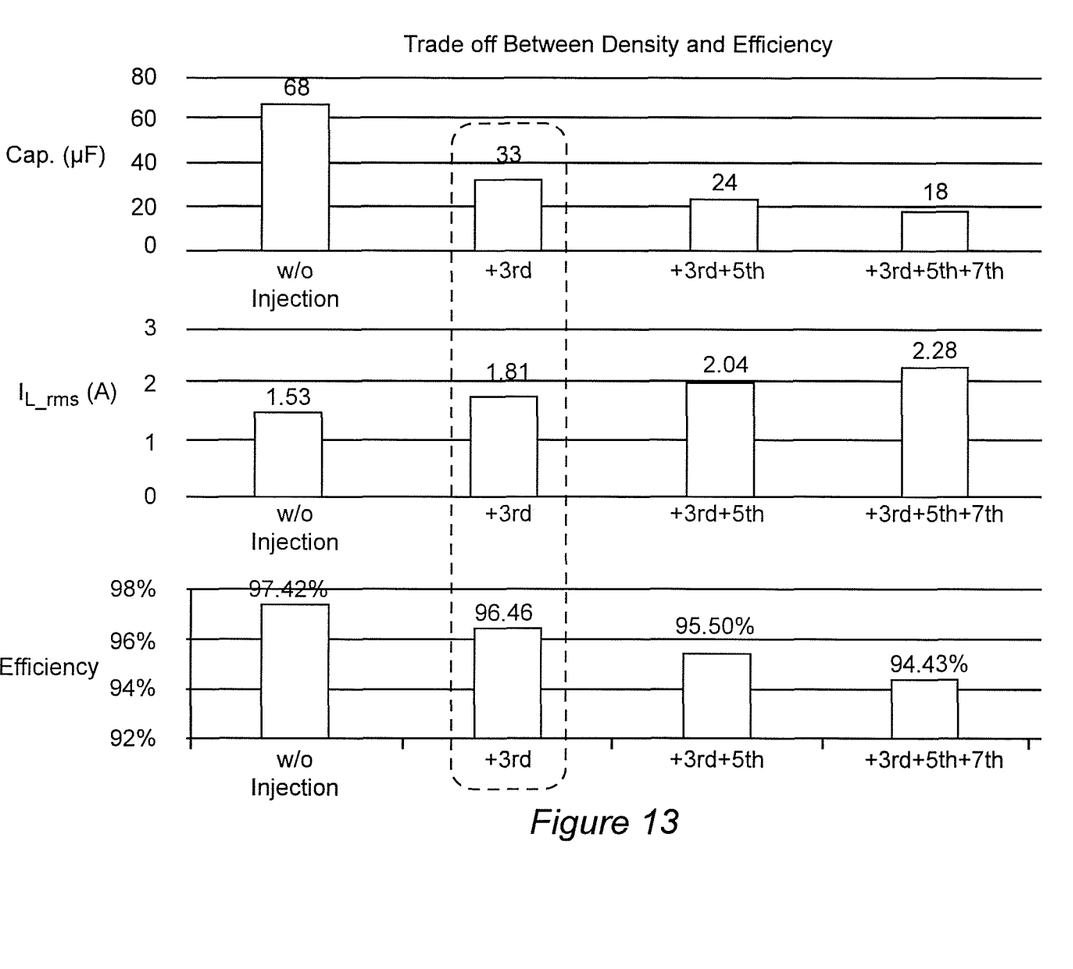

From equation (6), it can be seen that all the harmonic components less than $(n+1)^{th}$ order would be eliminated by injecting same magnitude current from third harmonic up to nth harmonic. It is therefore clear that the bus capacitance reduces with higher input power frequency. The relationship of capacitance reduction with harmonic injection up to $7^{th}$ order based on the 65 W adapter is shown in FIG. 13. More than 50% bus cap reduction is expected with only $3^{rd}$ harmonic current injection compared to the case without harmonic injection.

Figure 14:
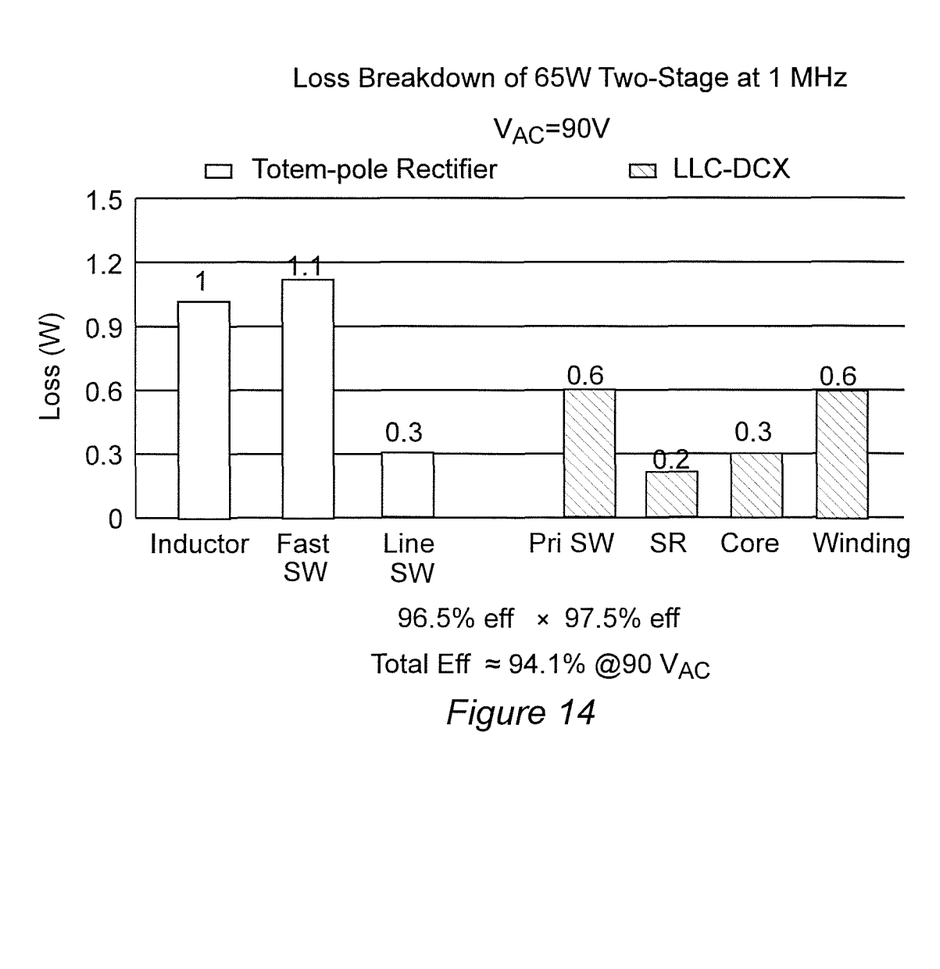
FIG. 14 is a graphical illustration of the loss breakdown for respective functional parts of the 65 W power converter of FIG. 11.

Thus, by inserting harmonics of the input voltage waveform, the bus capacitance required to maintain good second stage efficiency is reduced. The penalty is the increase of RMS current in the first stage which compromises efficiency of the first stage to a degree. For example, when the third harmonic is injected, the bus capacitance can be reduced by 50% but the efficiency drops only about 1% as illustrated in FIG. 13. The disparity of this impact is diminished with higher order harmonics and it is therefore preferred to limit injected harmonics to the third harmonic since relatively marginal improvement is obtained if further harmonics are injected as also shown in FIG. 13. The overall loss breakdown for the respective portions of the embodiment of FIG. 11 with third harmonic injection is shown in FIG. 14.

It should be noted that while the PFC circuit is required to comply with the IEC61000 3-2 standard, some modest level of third harmonic injection is still available in order to reduce the size of the DC bus capacitor. The amplitude of each of the higher order harmonics can follow the envelope specified in the standard as long as a certain small margin is maintained. Even though the input current does not approximate a sinusoidal waveform a 30%-40% bus capacitance reduction compared with an embodiment having no harmonic injection can still be achieved.

In view of the foregoing, it is clearly seen that the novel two-stage totem pole and LLC-DCX architecture in accordance with the invention provides a power adapter of reduced volume and greatly increased power density as well as increased efficiency well beyond the already high efficiency of power adapters current available commercially at the present time. Operation at much increased frequency is also enabled by the invention allowing requirements for labor intensive passive component assembly that results in poor control of parameter variation and increased volume, particularly of magnetic components, to be reduced. The architecture of the invention also allows injection of harmonics of input power that reduces requirements for bus capacitance and capacitor volume while maintaining high LLC-DCX stage efficiency.

While the invention has been described in terms of a single preferred embodiment, those skilled in the art will recognize that the invention can be practiced with modification within the spirit and scope of the appended claims.

We claim:

1. A power converter architecture including
    a first stage comprising a totem pole circuit and a controller for switches in said totem pole circuit,
    a second stage comprising a resonant direct current transformer (DCX) circuit and connected to said first stage by a voltage bus,
    a feedback circuit connecting an output of said DCX to said controller of said totem pole circuit whereby said totem pole circuit provides output voltage regulation as well as rectification of AC input power,
    a comparator in said feedback circuit for comparing an output voltage with a reference voltage, and
    a voltage adder for injecting at least one harmonic of an AC input voltage into a control signal output by said comparator.

2. The power converter architecture as recited in claim 1, further comprising
    an additional comparator for comparing said control signal with a ramp waveform to develop a pulse width modulated signal.

3. The power converter architecture as recited in claim 2, further including
    a pulse width modulator to generate pulse width modulated signals for controlling said totem pole circuit and further pulse width modulating said pulse width modulated signals to achieve voltage regulation.

4. The power converter architecture as recited in claim 3, wherein said pulse width modulator is responsive to a waveform of AC input power to provide power factor correction.

5. The power converter architecture as recited in claim 1, wherein said comparator comprises an amplifier providing gain in said feedback circuit.

6. The power converter architecture as recited in claim 5, further comprising
    an additional comparator for comparing said control signal with a ramp waveform to develop a pulse width modulated signal.

7. The power converter architecture as recited in claim 6, further including
    a pulse width modulator to generate pulse width modulated signals for controlling said totem pole circuit and further pulse width modulating said pulse width modulated signals to achieve voltage regulation.

8. The power converter architecture as recited in claim 7, wherein said pulse width modulator is responsive to a waveform of AC input power to provide power factor correction.

9. A method of operating a power converter, said method comprising steps of rectifying input AC voltage with a totem pole switching circuit to provide DC power, periodically connecting and disconnecting a primary winding of an isolation transformer to said DC power, rectifying a voltage on a secondary winding of said isolation transformer to provide an output voltage, and controlling a circuit for driving switches of said totem pole switching circuit in accordance with said output voltage to provide regulation of said output voltage, providing amplification of said control feedback signal, injecting at least one harmonic of said AC power into said control feedback signal, and comparing said output voltage with a reference voltage to provide a control feedback voltage, wherein said controlling step is also responsive to a waveform of said AC input voltage to perform power factor correction, wherein said step of periodically connecting and disconnecting said primary winding of said isolation transformer to said DC power is performed at a constant frequency.

10. A method of operating a power converter, said method comprising steps of rectifying input AC voltage with a totem pole switching circuit to provide DC power, periodically connecting and disconnecting a primary winding of an isolation transformer to said DC power, rectifying a voltage on a secondary winding of said isolation transformer to provide an output voltage, controlling a circuit for driving switches of said totem pole switching circuit in accordance with said output voltage to provide regulation of said output voltage, and injecting at least one harmonic of said AC power into said control feedback signal.

* * * * *